United States Patent [19]
Foord

[11] Patent Number: 5,144,280
[45] Date of Patent: * Sep. 1, 1992

[54] BI-DIRECTIONAL MULTI-FREQUENCY RIPPLE CONTROL SYSTEM

[75] Inventor: Peter M. Foord, Wattle Park, Australia

[73] Assignee: The Electricity Trust of South Australia, Australia

[*] Notice: The portion of the term of this patent subsequent to Sep. 19, 2006 has been disclaimed.

[21] Appl. No.: 389,528

[22] Filed: Aug. 4, 1989

Related U.S. Application Data

[63] Continuation-in-part of Ser. No. 89,663, Aug. 24, 1987, Pat. No. 4,868,539, and a continuation-in-part of Ser. No. 723,615, Apr. 15, 1985, abandoned.

[30] Foreign Application Priority Data

Apr. 17, 1984 [AU] Australia ............... PG4614

[51] Int. Cl.$^5$ .................................... H04M 11/04
[52] U.S. Cl. .......................... 340/310 A; 340/310 R
[58] Field of Search ........ 340/310 R, 310 A, 310 CP; 307/3, 39, 40; 364/492; 375/96, 97, 103

[56] References Cited

U.S. PATENT DOCUMENTS

| | | | |
|---|---|---|---|
| 3,488,517 | 1/1970 | Cowan et al. | 307/3 |
| 3,626,297 | 12/1971 | Green et al. | 325/60 |
| 4,106,007 | 8/1978 | Johnson | 340/310 A |
| 4,359,644 | 11/1982 | Foord | 307/40 |
| 4,538,136 | 8/1985 | Drabing | 340/310 R |
| 4,556,864 | 12/1985 | Roy | 340/310 A |
| 4,800,507 | 1/1989 | Brown | 307/3 X |
| 4,815,106 | 3/1989 | Propp et al. | 340/310 R X |
| 4,868,539 | 9/1989 | Foord | 340/310 A |

FOREIGN PATENT DOCUMENTS

| | | |
|---|---|---|
| 29193 | 5/1969 | Australia ............ 340/310 R |
| 409826 | 1/1971 | Australia . |
| 423376 | 4/1972 | Australia . |
| 443023 | 11/1973 | Australia . |
| 465762 | 9/1975 | Australia . |
| 466312 | 10/1975 | Australia . |
| 487694 | 10/1977 | Australia . |
| 487982 | 10/1977 | Australia . |
| 2705643 | 8/1978 | Fed. Rep. of Germany . |
| 259157 | 1/1949 | Switzerland . |

OTHER PUBLICATIONS

Wazencraft et al., Principles of Communication Engineering, pp. 516, 517 (1967).
Schwartz, Information Transmission, Modulation & Noise, pp. 197-201 (1970).
Schnieper, New Transmission Systems Over The Mains Allow Cost-Effective Individual Control, C.I.R.E.D. Conference, pp. 1-6 (1975).
Schnieper, Bi-Directional Ripple Control System Decabit/Retrobit, I.E.E.E. Control of Power Conference, pp. 1-5 (1976).
Baumann, New Developments in the Field of Audio-Grequency Signal Transmission Over Power Mains, Proceedings of the Association of Municipal Electricity Undertakings of South Africa, pp. 32-49 (1974).
Davis, Report to the 50th Annual Conference Electricity Supply Engineers Association of New South Wales, pp. 5-1 thru 5-7 (1975).

Primary Examiner—Jin F. Ng
Assistant Examiner—Brian R. Tumm
Attorney, Agent, or Firm—Baker, Maxham, Jester & Meador

[57] ABSTRACT

A bidirectional ripple control system in which a code comprises an audio frequency signal superimposed on an electric power distribution system by an LC resonant circuit, controlled by a transmitter crystal oscillator which controls the signal frequency. A receiver has a pair of synchronous filters driven by a receiver crystal oscillator 90 degrees out of phase with each other. The outputs of the filters are squared and summed to form a single output independent of phase. For discrimination the output frequency of each synchronous filter is compared with a set level and the incoming signal is rejected if this frequency exceeds the set level. This system provides a very narrow band frequency detector for the receivers and enables the use of a large number of closely spaced frequencies for the formation of signalling codes. The system provides a means for bidirectional communication on an existing power distribution network.

10 Claims, 7 Drawing Sheets

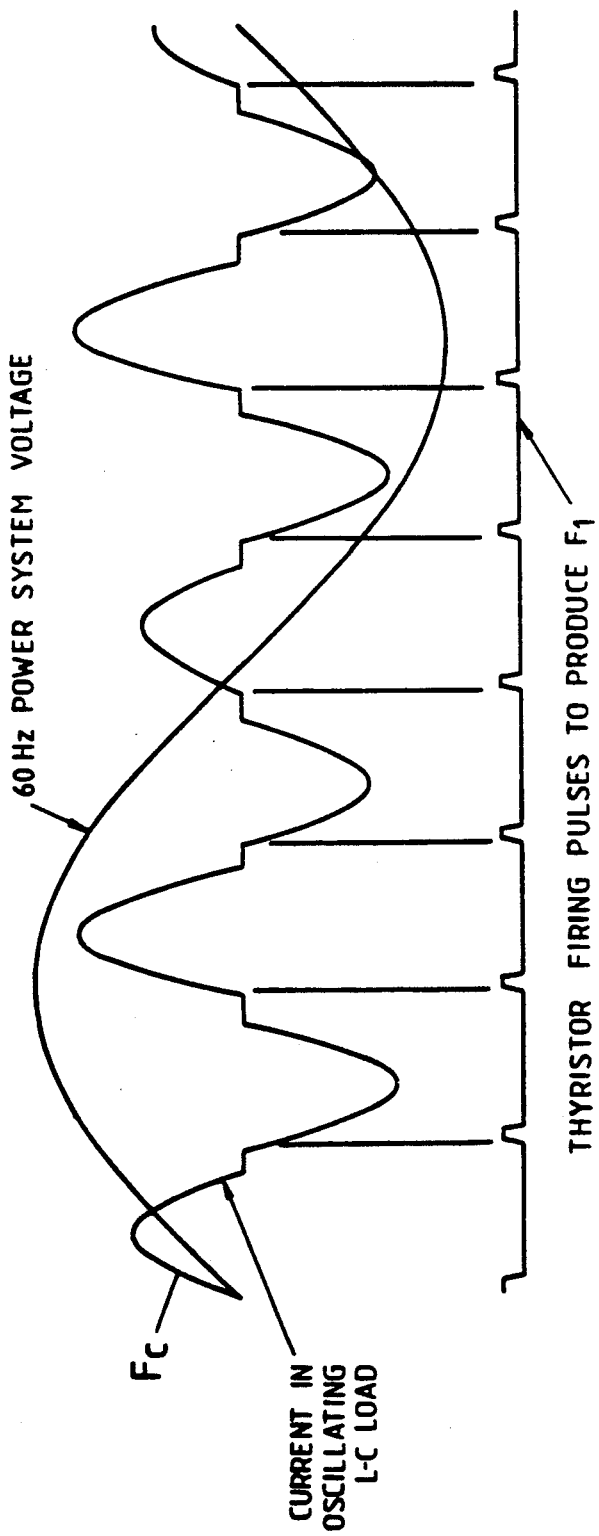
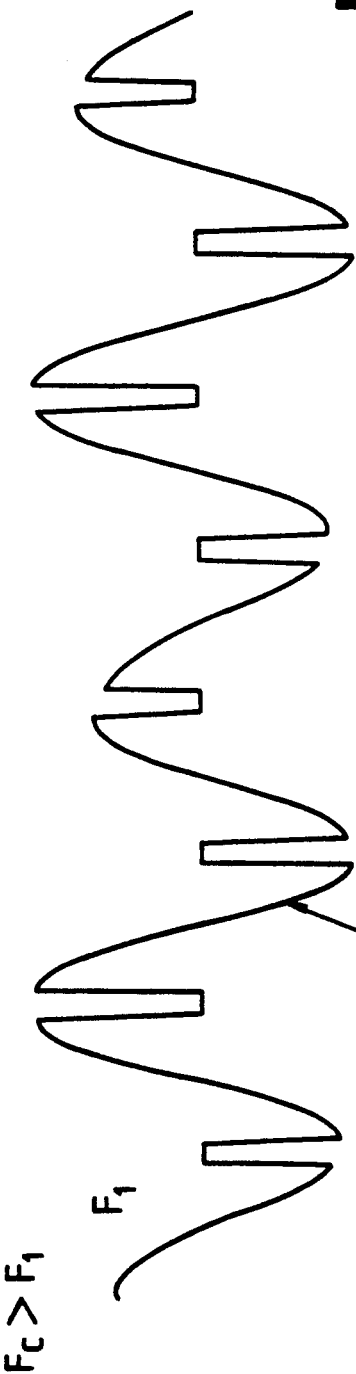
FIG. 3a
FIG. 3b 5 6 7 8 9   FREQUENCY NOS.
M4 M2 M1 M3 M5   REL. MAGNITUDES

BI-DIRECTIONAL MULTI-FREQUENCY RIPPLE CONTROL SYSTEM

FIELD OF THE INVENTION

This invention relates to improvements in a ripple control scheme, referred to as Sequential Waveform Distortion (SWD) control. This is a continuation-in-part application made with respect to a co-pending application Ser. No. 089,663, filed Aug. 24, 1987, now U.S. Pat. No. 4,868,539, issued Sep. 19, 1989, the contents of which are incorporated by way of reference U.S. Pat. No.

4,868,539 resulted from continuation-in-part application Ser. No. 089,663 and from application Ser. No. 06/723,615, filed Apr. 15, 1985 now abandoned.

BACKGROUND OF THE INVENTION

Reference can be made to our U.S. Pat. No. 4,359,644 which described an improved form of ripple control in which a transmitter generated audio frequency signals on a power system as a sequence of waveform distortions by means of a series connected inductive-capacitive oscillating load, the signal being detected in receivers using a synchronous correlation method of detection in which two synchronous filters (correlators) were run in quadrature and their squared outputs summed to form a non-phase sensitive detector.

The main object of this invention is to provide improvements to the SWD control scheme, as described in aforesaid U.S. Pat. No. 4,359,644, which can show financial savings while retaining an even narrower bandwidth than that achieved in devices made according to the specification of that patent, and to provide modifications to the invention disclosed in U.S. Pat. No. 4,868,539.

In the SWD control scheme described in U.S. Pat. No. 4,359,644 aforesaid identical control frequencies were generated in both the transmitter and the receiver. These two control frequencies are made identical by using the 60 Hz power mains frequency as a reference, synthesising a higher frequency using a phase looked-loop frequency multiplier circuit and then dividing by an integer. In this way, by using different dividing integers, a whole range of control frequencies were generated which were always identical at each end, that is, at the transmitter end and the receiver end of a power line. The control frequency was used in the transmitter to control the frequency of the inductive-capacitive oscillating load and thus the signal produced on the power system. In the receiver the control frequency was used to drive the synchronous filters and thus determine the centre frequency for signal detection. The frequency of the output from each synchronous filter was equal to the difference between the signal frequency and the synchronous filter frequency. Hence when these two were identical the synchronous filter outputs were unidirectional or DC voltages. By measuring the time between zero crossings of these outputs it could be determined if these outputs were DC voltages or low frequency AC voltages. If these output frequencies were greater than a predetermined limit the receiver could be programmed to ignore the received signal. In this way discrimination could be achieved between signals as closely spaced as 0.5 Hz apart and thus a multi-frequency system of coding can be used.

BRIEF SUMMARY OF THE INVENTION

In this invention, as an alternative to synthesising identical control frequencies from the 60 Hz mains at each end, crystal controlled oscillators are used. With such the two control frequencies will no longer be identical but, due to available close frequency tolerance of the crystals, will differ only slightly. By selecting suitable crystal tolerances the difference in frequency can still be within the allowable range for signal acceptance. The main advantage of using crystal controlled oscillators in place of the phase-locked loop frequency multipliers is reduced cost, this being very critical for the mass produced equipment to be installed in each customer switchboard.

The basic transmitter oscillating load circuit consists of an inductor, capacitor and inverse parallel connected thyristors all connected in series directly across the low voltage mains. This basic circuit is described in our previous U.S. Pat. No. 4,359,644. An enhancement to this circuit is described in U.S. Pat. No. 4,868,539 and consists of connecting a second inductor in parallel with the basic inductor-capacitor combination, shown as L1 in FIG. 1 of U.S. Pat. No. 4,868,539. The effect of this additional inductor is to increase the level of oscillation in the main LC circuit, allowing smaller, lower cost components to be used for a given signal level and enabling adjustment of the signal level. This invention also embodies the second inductor.

The SWD system enables extremely narrow band signalling which results in very high rejection of unwanted noise and signals. It is therefore also practical to signal upstream from a customer to a power distribution substation and the invention extends to an upstream receiver, which the invention makes viable, because of the narrow band signalling and the low cost of the components.

DESCRIPTION OF THE DRAWINGS

Reference is now made to the accompanying drawings in which:

FIGS. 3A and 3B show the transmitter current and voltage curves in relation to the power system voltage;

DESCRIPTION OF THE PREFERRED EMBODIMENT

Figure 1:
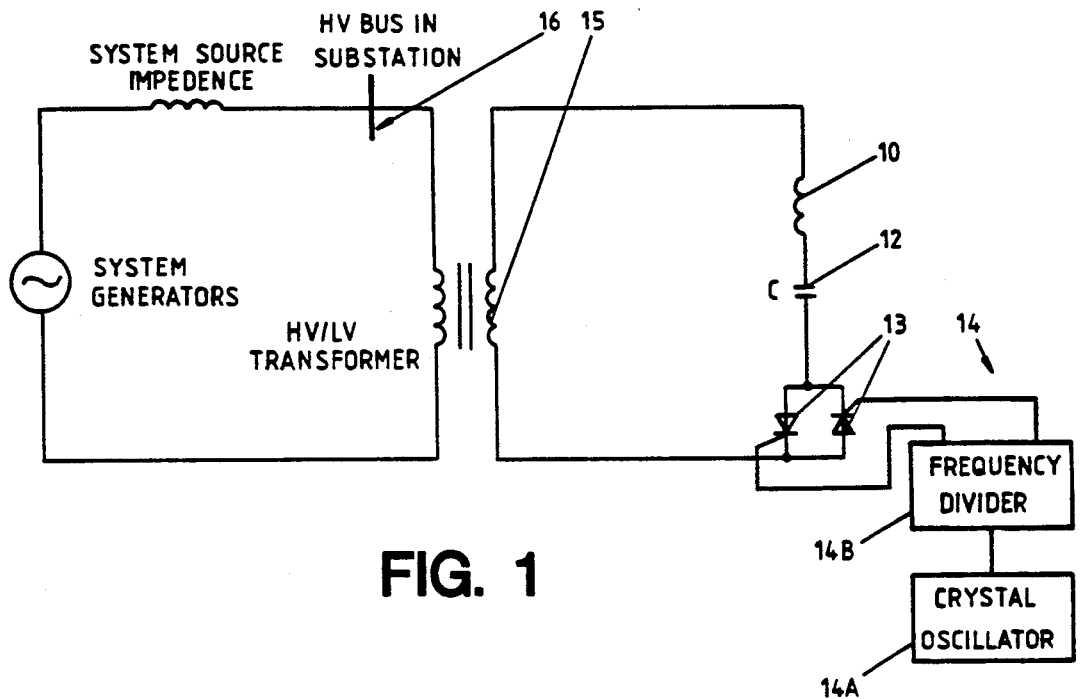
FIG. 1 is the basic transmitter circuit.

FIG. 1 shows the basic transmitter circuit which consists of a resonant frequency oscillator having an air cored inductor 10 in series with a capacitor 12, and two inverse parallel connected thyristors 13, connected across a low voltage supply in a power supply substation. The thyristors 13 are alternately fired by the transmitter control unit 14 at the desired signal frequency but the resonant frequency of the LC combination is made about 15% to 25% higher than this signal frequency. This arrangement causes the circuit to oscillate, in a discontinuous manner, at the desired signal frequency, the thyristors 13 sequentially initiating each half cycle. Different rates of thyristor firing will produce signals of different frequencies effected as a sequence of waveform distortions.

Codes for downstream signalling are formed by the continuous transmission of one frequency. This transmission is then divided into a start bit followed by binary data bits by phase reversals of the transmitted signal. These phase reversals are achieved merely by delaying the firing of the thyristors by 180°. The transmitter control unit 14 comprises a transmitter crystal oscillator 14A and a programmable frequency divider 14B which provides a signal frequency. Frequency divider 14B is a micro-controller (Motorola MC68HC11A2), which also embodies the function of reversing the phase of the generated signal in the generation of signal codes. The LC resonant frequency being slightly higher than the thyristor firing frequency causes the thyristors to commutate off a short time before the next firing pulse arrives. This results in a short period of zero current after each half cycle of oscillation (FIGS. 3A and 3B). Because of these discontinuities the circuit is disturbed into further oscillation after each half cycle and thus the circuit continues to oscillate. The resultant individual half cycles of load current, when reflected back into the source impedance of the power system, cause a sequence of voltage waveform distortions. The overall effect of this sequence is to produce a signal which closely resembles a sine wave at the required signalling frequency. In FIG. 1 the transmitter circuit is coupled by means of a transformer 15 to a high voltage power system 16.

Figure 2:
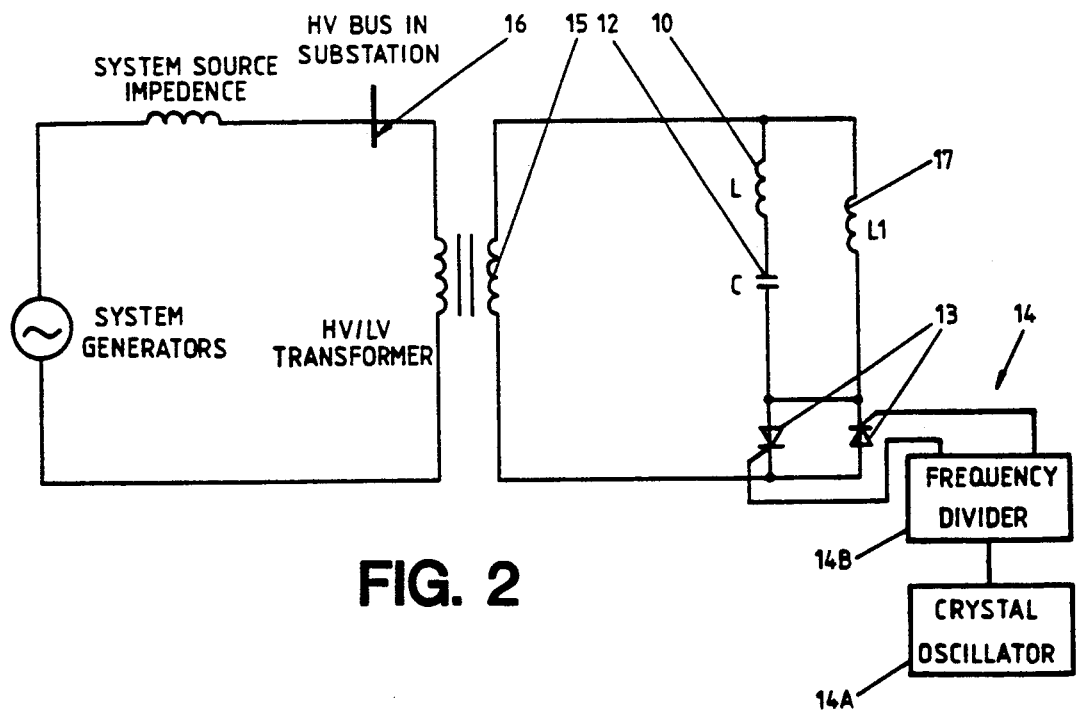
FIG. 2 is the improved transmitter circuit with added inductor L1.

FIG. 2 shows the same basic transmitter circuit but with the extra inductor 17 added. The pair of thyristors 13 act as a switch in the circuit and as this switch is closed most of the time, the current through inductor 17 (L1) is predominantly 60 Hz. For the short periods when the switch is open, stored energy in L1 will flow into capacitor 12, increasing the energy in the oscillating circuit thus making the amplitude of oscillation greater. The level of oscillation can be adjusted by altering the value of inductor 17 (L1).

FIGS. 3A and 3B shows the representative shape of 60 Hz Power system voltage and the discontinuous resonant circuit current waveform. When the second inductor L1, 17, of FIG. 2 is used, during each current gap after each half cycle of the oscillation, when the thyristors are open circuit, and stored energy from the inductor L1, 17, flows into the capacitor C, 12, thus increasing the level of oscillation. The thyristors are commutated off as the current pulse goes to zero. The off period not only allows an enhancement of the oscillation by inductor L1 but also allows the circuit to oscillate at different frequencies by varying the thyristor firing rate.

This is possible since the conduction period of the thyristors is set by the period of the resonant circuit but the total period of the voltage signal is set by the timing of the thyristor firing. Thus, it can be seen that the resonant frequency of the LC combination is not critical as it is higher than the transmitted frequency.

Figure 4:
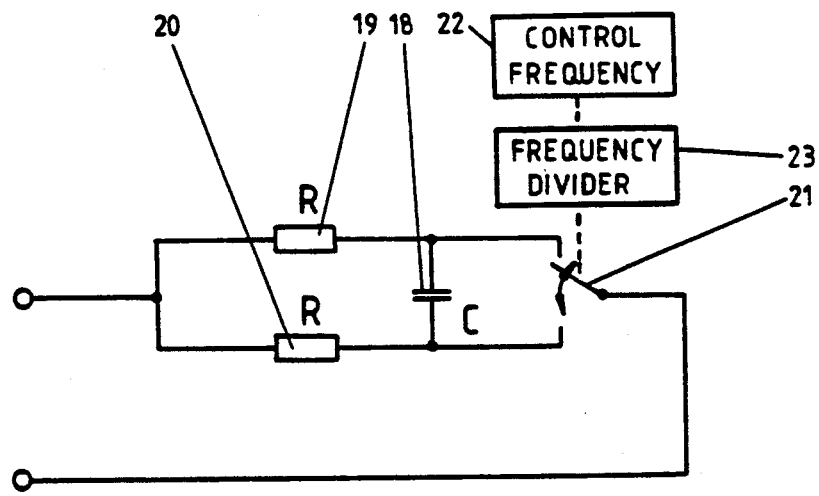
FIG. 4 is the basic synchronous filter circuit.

FIG. 4 shows a receiver detector circuit, particularly illustrating a basic synchronous filter circuit. This arrangement differs slightly from that described in the previous application but its function is the same. Capacitor 18 is alternately charged through resistors 19 and 20 as controlled by changeover switch 21. Switch 21 is a solid state device of CMOS construction, and is driven by a control frequency from a receiver crystal oscillator 22 through a programmable frequency divider 23. The circuit is connected directly to the mains 110 V 60 Hz supply on which a small signal may be present. If the signal frequency is precisely the same as the control frequency driving the switch then the switch synchronously rectifies the signal and produces an unidirectional or DC voltage on the output capacitor 18. If the signal differs from the control frequency then the output frequency on the capacitor 18 is the difference between the two frequencies. For example if the control frequency is 310 Hz and the signal frequency 310.5 Hz then the output frequency of the synchronous filter is 0.5 Hz. Thus the output frequency gives a direct measure of how close the signal frequency is to the filter centre frequency. By measuring this output frequency a decision can be made whether or not to accept the signal frequency. Such a measurement can be made by measuring the time between zero crossings of the synchronous filter output.

As explained in U.S. Pat. No. 4,359,644, with only one synchronous filter the detector is phase sensitive, giving full output for an in-phase signal and zero output for a quadrature signal. By using two synchronous filters driven at the same frequency but 90 degrees out of phase with each other, squaring their outputs and summing the squares, a non-phase sensitive detector is achieved.

The control frequency to drive the switches in the receiver and the control frequency to fire the thyristors in the transmitter are both generated in exactly the same manner. The method described in our previous U.S. Pat. No. 4,359,644 was to use the mains frequency (typically 60 Hz) as a reference, multiply it to a higher frequency by means of a standard phase-locked-loop frequency multiplier circuit then divide by an integer. By using different integers for dividing, a large number of closely spaced control frequencies could be generated. When using that method the same control frequency can be generated in the transmitter and the receiver. The alternative method of generating the control frequencies in this invention uses crystal controlled oscillators. This has now developed into a lower cost approach and therefore has advantages for the receiver. With the crystal control method the transmitter and receiver control frequencies will be very close but no longer necessarily identical. However by selecting suitable crystal tolerances the difference in frequency can still be within the allowable range for signal acceptance. A stable and accurate crystal can be used in the transmitter as cost is not critical. However in the receiver, cost is very critical and a less stable and accurate crystal must be used. Suitable tolerances have been found to be +/−10 ppm for the transmitter and +/−200 ppm for the receiver.

Figure 5:
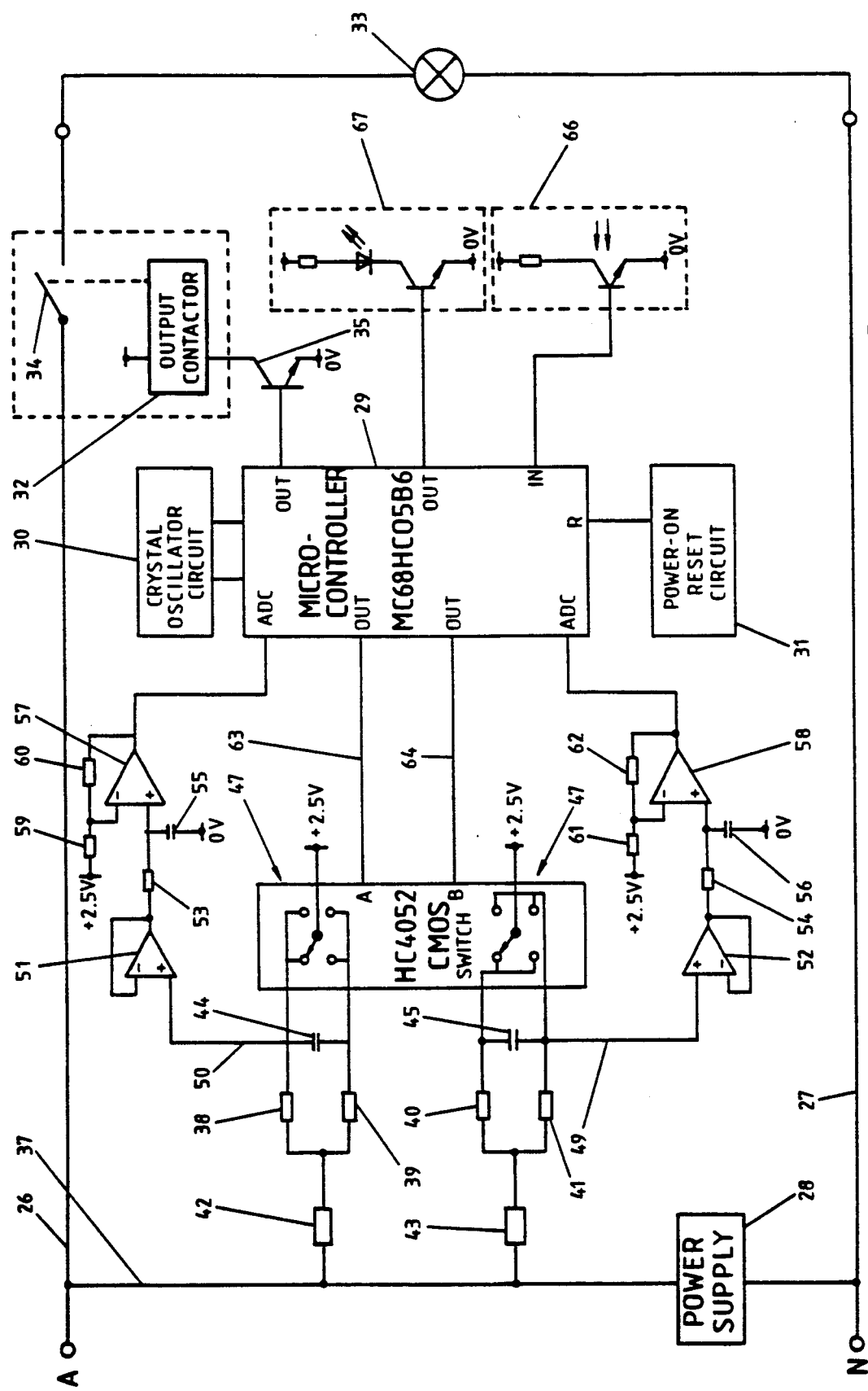
FIG. 5 is the complete SWD receiver circuit.

FIG. 5 shows the receiver circuit in more detail. The 110 V mains supply consists of active line 26 and neutral line 27. Low voltage power supply 28 is shown in block diagram form and uses a standard transformer, rectifier and regulator arrangement. The single chip micro-controller 29 is a standard Motorola device type MC68HCO5B6. The 3.2768 MHz crystal oscillator 30 for the micro-controller is shown in block diagram form and is the standard arrangement recommended by Motorola, the only stipulation being that the crystal tolerance should not be greater than 200 ppm. The programmable divider for the crystal oscillator frequency is embodied within the microcontroller 29. The power on reset circuit 31 shown in block form is the standard Motorola arrangement. Output contactor 32 controls supply to the external consuming device 33 with contact 34. Control of the contactor 32 comes from the microcontroller through power transistor 35.

The signal input path to the synchronous filters is line 37. Resistors 38, 39, 40, 41, 42 and 43 form resistive dividers and in conjunction with capacitors 44 and 45 form low pass filters for the two synchronous filters. The synchronous filters are formed by these low pass filters and dual CMOS analogue switch type HC4052, designated 47. Outputs from the synchronous filters are on lines 49 and 50.

These outputs 49 and 50 are buffered with voltage followers 51 and 52 and then further filtered with low pass filters formed from resistors 53 and 54 and capacitors 55 and 56. Output from these filters is then increased by amplifiers 57 and 58 in conjunction with resistors 59, 60, 61 and 62.

The microcontroller has analogue to digital conversion capability which is used to measure the amplified voltage from each of the two synchronous filter circuits. The total combined signal is calculated by the microcontroller. If P and Q are the outputs measured from each synchronous filter then S, the total signal is:

$$S = \sqrt{(P^2 + Q^2)}$$

Figure 6:
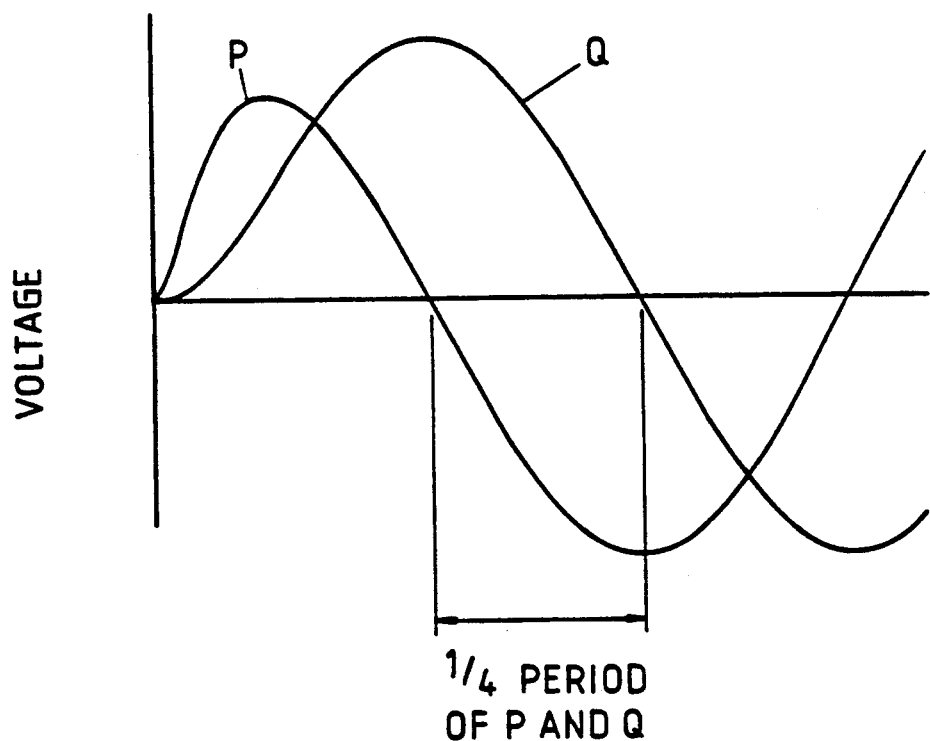
FIG. 6 shows the voltages P and Q and their possible time relationship.

One criterion for signal acceptance is that S is greater than a set threshold level and this test is carried out by the microcontroller 29. The microcontroller 29 also measures the time between successive zero crossings of P and Q, as shown in FIG. 6, to decide whether or not to accept the signal. The time between successive zero crossings of P and Q is equivalent to a quarter period of the synchronous filter output. If this period is less than say 1 second then P and Q each have a period which is less than 4 seconds. This means that the signal frequency is more than 0.25 Hz removed from the centre frequency of the synchronous filter and the microcontroller 29 is programmed to reject it.

In this embodiment the control frequency to drive the synchronous filter switch is derived from the microcontroller crystal oscillator 30, FIG. 5. An inbuilt programmable timer in the microcontroller is used as a programmable frequency divider to generate the control frequencies Fc and 2Fo which are then used to drive the analogue switch 47 through lines 63 and 64. The HC4052 switch 47 is a 2 pole 4 position switch so by driving it at 2 Fc and connecting alternate positions together two change-over switches can be formed 90 degrees apart and effectively driven at the required control frequency Fc. If a multi-frequency code is used each successive control frequency can be generated by the microcontroller. Multi-frequency coding has the advantage of enabling the generation of a very large number of codes with relatively few data bits. Single frequency coding can also be used and is preferred for downstream signalling. The microcontroller 29 specified has inbuilt non-volatile memory and hence all setting parameters can be programmed into this memory.

By transmitting data to the receiver these setting parameters can be remotely altered. Setting parameters can also be locally programmed by means of the optical link provided by photo transistor receiving circuit 66 and light emitting diode transmitting circuit 67.

As a large number of different control frequencies can be generated simply by using a different integer to divide the crystal frequency, a unique frequency can be allocated to each substation of a power distribution network. By using a different frequency at each substation the problem of signal spill-over from one substation to another is completely avoided. All downstream codes consist of a continuous transmission of the allocated frequency. This transmission is divided into a variable length start bit and binary data bits by phase reversals of the transmitted signal. For binary data a phase reversal indicates a binary '0' and no phase reversal a binary '1'. Reversing the phase of the transmitted signal causes the received signal to sharply dip to zero and thus gives a clear indication in the received signal. The duration of each binary data bit is 1 second. Phase reversals of the transmitted signal are achieved merely be delaying the firing of the thyristors by 180°.

Figure 7:
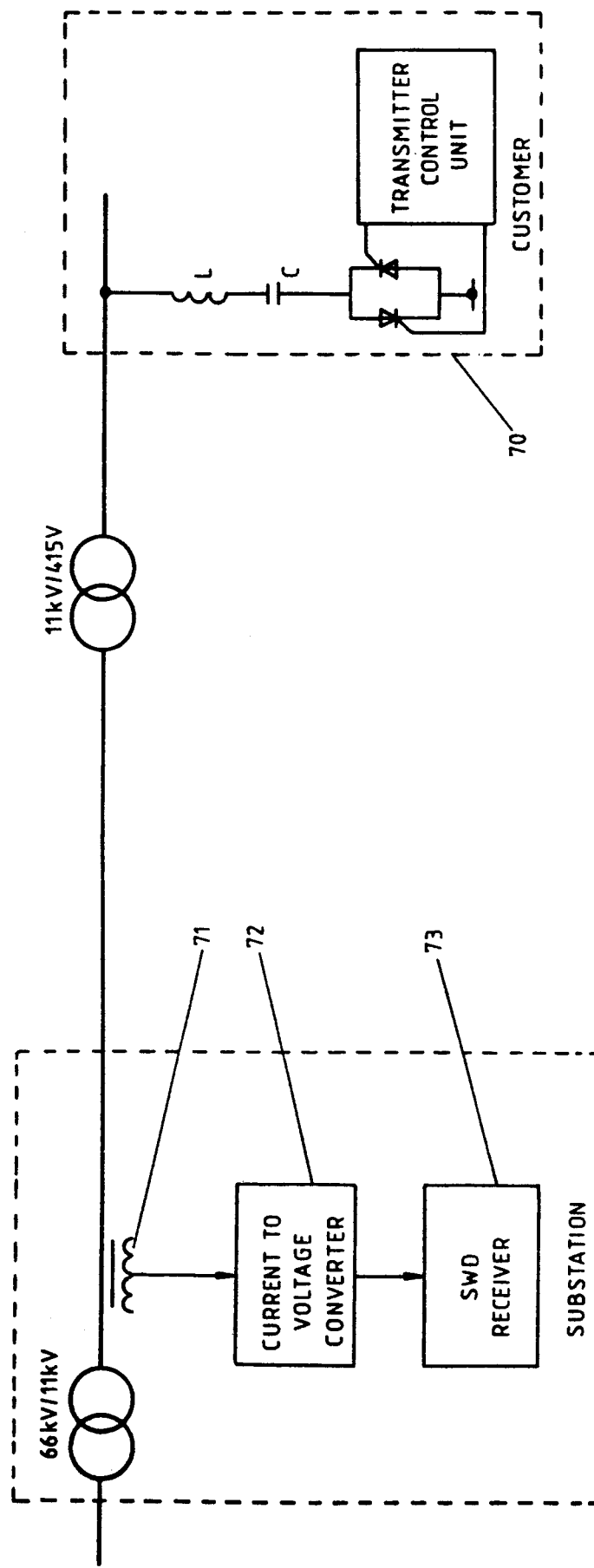
FIG. 7 shows the arrangement for upstream signalling.

The system described above is for transmission downstream from a substation to a customer for the remote control of load, as for all ripple control schemes. A unique feature of the SWD scheme is that it can also be used for upstream transmission from a customer to a substation. In this mode the transmitter current generated at the customer is detected at the substation by first isolating it with a high voltage current transformer, then turning it into a voltage for detection by the double synchronous filter arrangement described above. This arrangement is shown diagrammatically in FIG. 7 in which a very small transmitter 70 is located at the customer and connected to the low voltage supply. At the substation the signal is isolated with current transformer 71, converted to a voltage by current to voltage converter 72 and detected with SWD receiver 73. Transmission upstream can be used for remote meter reading and other distribution automation functions. A system of multi-frequency coding is used for upstream signalling in order to reduce the number of data bits required and hence the transmission time. The upstream receiver is therefore slightly different from the downstream receiver of FIG. 5, although the underlying principles are unchanged. The following is a description:

UPSTREAM RECEIVER DESCRIPTION

Figure 8:
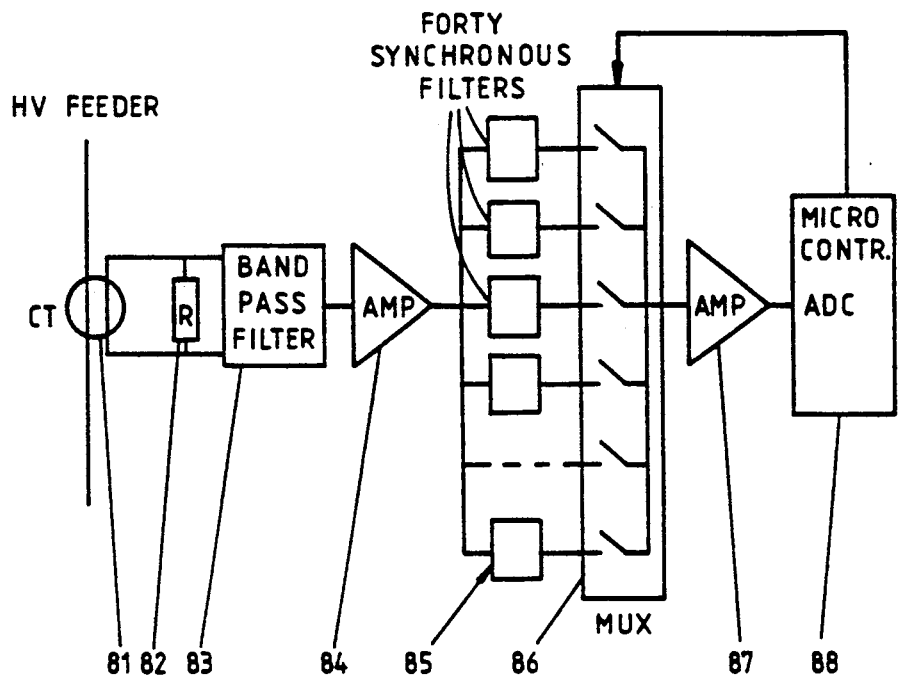
FIG. 8 is an upstream receiver block diagram.

The substation based receiver for detecting signals transmitted upstream from a customer, uses the same principles as the downstream receiver. However multi-frequency coding is used for upstream transmission in order to reduce the number of data bits required and hence the transmission time. By transmitting information using 40 different frequencies to represent base 32 numbers, only 4 bits are required to transmit a 6 digit decimal number. Each bit is formed by the transmission of a frequency for a fixed period of time. A bank of receivers is required, one for each frequency. The upstream receiver is shown in FIG. 8.

A current transformer 81 is used to isolate the current from the high voltage feeder supplying the remote customer. This current will consist of a large 60 Hz component from the load and an extremely small component at the signalling frequency when a signal is being sent. This current is converted into a voltage by passing it through resistor 82. A band-pass filter 83 with a bandwidth of about 30 Hz is then used to remove most of the 60 Hz component and its harmonics. Amplifier 84 is used to amplify the signal before it passes to the bank of 40 synchronous filters 85. Each of the 40 synchronous filters consists of a pair of correlators in quadrature as for the previously described downstream receivers. Multiplexer 86 is controlled by the microcontroller 88 and is used so that the output of each synchronous filter can be measured by one analogue to digital converter in the microcontroller. Each output is amplified by amplifier 87 before conversion and measurement.

The customer based upstream transmitter uses the same basic arrangement as for the substation based downstream transmitter of FIG. 5, the only difference being one of scale. The customer based unit is very much smaller and typically draws a current of about 7 amperes at the signalling frequencies. The firing of the thyristors is controlled by a microcontroller in exactly the same way as for the larger downstream transmitter previously described.

Figure 9:
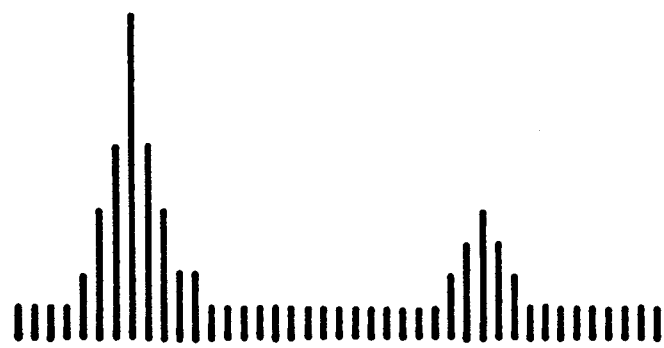
FIG. 9 illustrates graphically output magnitudes from 40 synchronous filters.

During the transmission of 4 bits of base 32 data the magnitudes of the outputs from each of the 40 synchronous filters could instantaneously be as shown in FIG. 9.

Figure 10:
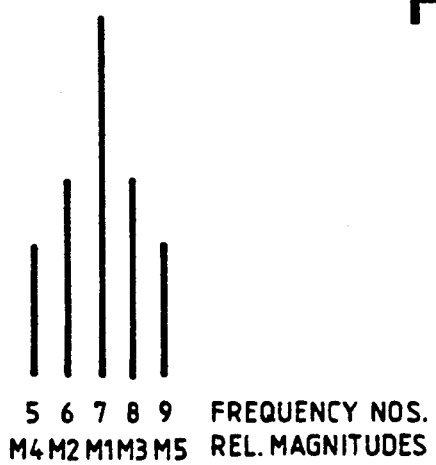
FIG. 10 illustrates the examination routine of output magnitudes.
Figure 11:
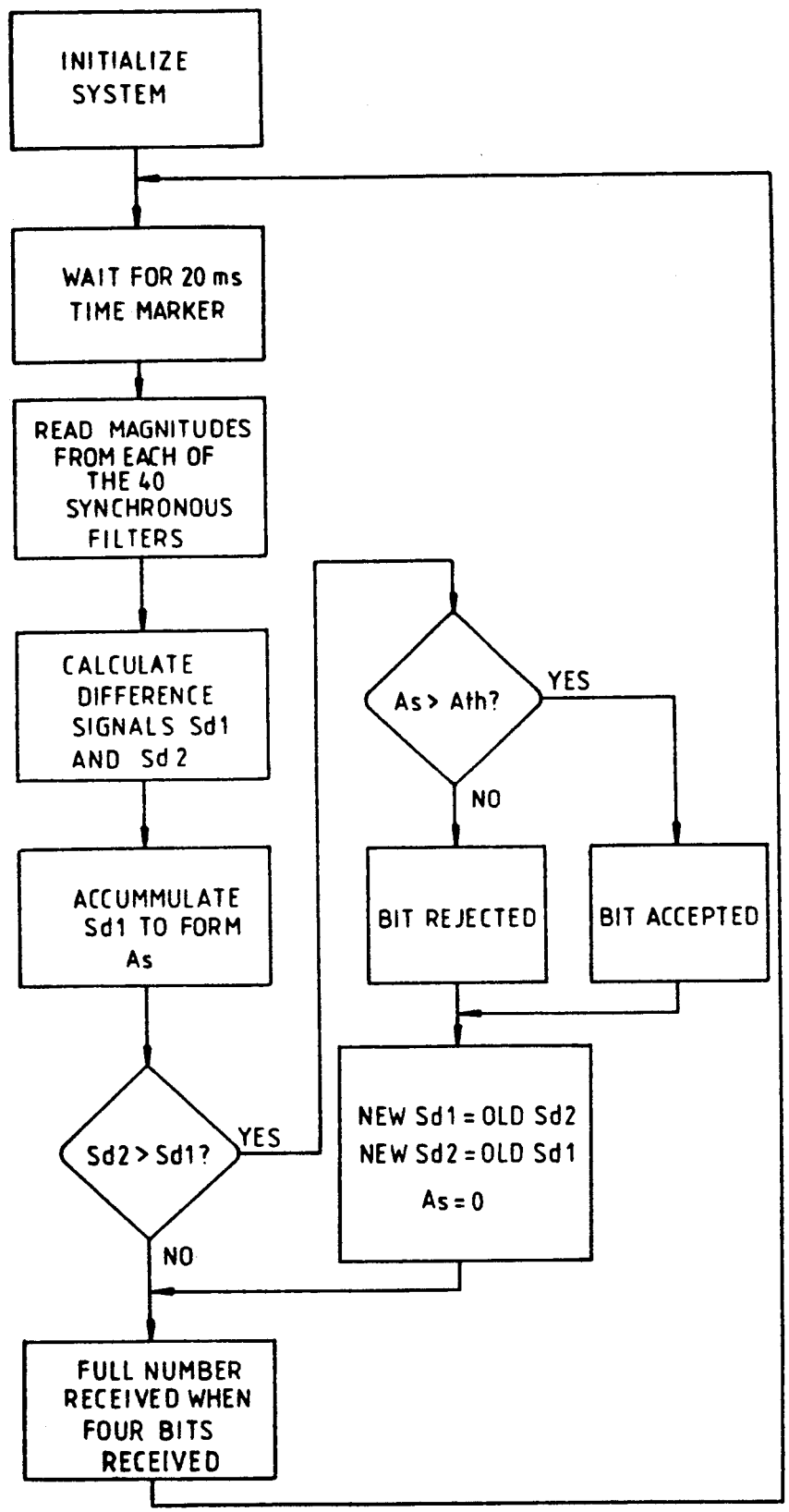
FIG. 11 is a condensed block diagram of the algorithm utilised in the micro computer of FIG. 8.

Software in the microcontroller performs the algorithm shown in FIG. 11 every 20 milliseconds, and examines the magnitudes of the outputs from all 40 synchronous filters. It examines relative magnitudes by looking at 5 adjacent outputs at a time (FIG. 10). That is, it starts by examining the magnitudes of frequencies 0, 1, 2, 3 and 4, then 1, 2, 3, 4 and 5, then 2, 3, 4, 5 and 6 etc., all designated with the prefix M, until all 40 frequencies are examined. When the middle frequency has the highest magnitude and the outer ones the lowest a difference signal Sd is calculated. FIG. 10 shows the magnitudes of five adjacent magnitudes. The signals Sd are determined according to:

$$Sd = (M1-M2) - (M2-M3) + (M3-M4) - (M4-M5)$$

where
M1 = highest magnitude
M2 = next highest magnitude
etc.

The Sd values are then compared and the two highest selected, Sd1 and Sd2. The value of the highest Sd (Sd1) is then summated every 20 ms to form a cumulative total As, which is really the area under the Sd1 against time curve. In this way the signal is integrated over time and allows very small signals to be detected in the presence of large noise levels. When Sd1 is no longer the maximum, that is, Sd2 is greater than Sd1 because a new frequency is being transmitted, then the summated total As is compared with a threshold Ath for either acceptance or rejection. If it is accepted it represents one bit of information and the value of the bit will be determined by the frequency of the accepted bit. As each bit is transmitted it is accepted in a similar manner. If 32 frequencies are used to represent base 32 data then 4 bits of information can be used to represent any decimal number up to 1048576.

The claims defining the invention are as follows:

1. In a ripple control system for an alternating current electric power distribution network which comprises a transmitter for transmitting a code and a receiver for receiving said code, said transmitter being coupled to the distribution network to superimpose a signal on the power frequency waveform as a sequence of waveform distortions, improvements comprising:

frequency control means to accurately generate closely spaced frequencies in the transmitter to enable use of multi-frequency codes, said frequency control means comprising an inductance/capacitance resonant combination, a transmitter crystal oscillator, a transmitter programmable frequency divider and electronic switches between the crystal oscillator and the resonant combination, operation of the switches being controlled by the oscillator the frequency of which is selectively divided by the programmable frequency divider to a frequency lower than the resonant frequency combination, the receiver comprising an input detector circuit having two synchronous filters squaring and summing means, a receiver crystal oscillator, a receiver programmable frequency divider and discrimination means, the synchronous filters being 90 degrees out of phase with each other and driven by frequencies derived from the receiver crystal oscillator by the operation of the frequency divider, the squaring and summing means squaring and summing the outputs of the synchronous filter thus forming a non-phase sensitive detector, and said discrimination means comprising a microcontroller coupled to the output of each said synchronous filter to be responsive to the magnitude of output of the non-phase sensitive detector, and to zero crossings of the synchronous filters outputs such that signal rejection occurs when
(a) said non-phase sensitive output magnitude is below a set threshold, or
(b) the time between successive zero crossings of either one of said synchronous filter outputs is less than a set minimum.

2. In a ripple control system for the power system of an alternating current electric power distribution network which comprises a transmitter, a receiver, and frequency control means for generating sufficiently closely spaced frequencies for use as a multi-frequency code signal, improvements wherein:

said frequency control means in the transmitter comprises a transmitter crystal oscillator, a transmitter microcontroller connected to function as a transmitter programmable frequency divider dividing the frequency of said oscillator, and electronic switch means comprising two inverse parallel thyristors, an inductance/capacitance resonant oscillator, means coupling the resonant oscillator to the transmitter programmable frequency divider such that the resonant oscillator is controlled by the electronic switch means, said thyristors being so controlled by said transmitter microcontroller as to impose the code signal on the inductance/capacitance resonant oscillator and means so coupling said resonant oscillator to the power distribution network as to draw energy from said network and impose said code signal onto the network;

said receiver coupled to said network and having detection and discriminating facilities which comprise a pair of synchronous filters, a receiver crystal oscillator, a receiver programmable frequency divider dividing the frequency of said receiver crystal oscillator and so coupling the synchronous filters to the receiver crystal oscillator as to control frequency of the synchronous filter outputs, said frequency divider dividing the synchronous filters to be 90 degrees out of phase with each other;

measuring and calculating means comprising a receiver microcontroller which squares and sums the outputs of the synchronous filters and compares said sums with a set threshold, and rejects said code signal if below said threshold, and further measuring means which measure the periods between successive zero crossings of the outputs of the synchronous filters and reject said code signal if the periods are below a set minimum.

3. Improvements in a ripple control system according to claim 2 wherein said synchronous filters comprise resistive/capacitive low pass filters and a dual CMOS analogue switch.

4. Improvements in a ripple control system according to claim 2 wherein said transmitter comprises an extra inductor connected across said inductance/capacitance resonant oscillator for the purpose of increasing and controlling the level of oscillation current.

5. Improvements in a ripple control system according to claim 2 wherein said transmitter is located at a customer remote from a substation and said receiver is located at a substation allowing the transmission of the multi-frequency code signal upstream.

6. Improvements in a ripple control system according to claim 5 wherein said receiver comprises the following elements: a current transformer, a resistor across the output of the current transformer, a band pass filter, a bank of said synchronous filters arranged in pairs, a multiplexer, said discrimination facilities comprising said receiver microcontroller, and electrical conductors interconnecting said elements, the receiver microcontroller embodying an analogue to digital converter, and arranged to examine relative magnitudes of the outputs of said synchronous filter to identify said code signal by the magnitude thereof.

7. Improvements in a ripple control system according to claim 2 wherein the transmitter microcontroller is programmed to impose said code signal by reversal of phase of the generated code signal.

8. Improvements in a ripple control system according to claim 2 wherein the resonant frequency of the inductance/capacitance oscillator is higher than the output frequency of said transmitter oscillator frequency divider, such that there is a brief period of zero current after each half cycle of oscillation of the resonant oscillator.

9. Improvements in a ripple control system according to claim 2 wherein the inductance/capacitance resonant oscillator comprises an inductor in series with a capacitor, and a further inductor across that series combination.

10. Improvements in a ripple control system according to claim 2 or claim 9 wherein said means coupling the resonant oscillator to the power distribution network comprises a transformer.

* * * * *